(12) United States Patent
Triggs

(10) Patent No.: US 6,546,387 B1
(45) Date of Patent: Apr. 8, 2003

(54) COMPUTER NETWORK INFORMATION MANAGEMENT SYSTEM AND METHOD USING INTELLIGENT SOFTWARE AGENTS

(75) Inventor: Howard William Thomas Triggs, British Isles (GB)

(73) Assignee: Transcom Software Inc., Tortola (VG)

( * ) Notice: Subject to any disclaimer, the term of this patent is extended or adjusted under 35 U.S.C. 154(b) by 0 days.

(21) Appl. No.: 09/440,365

(22) Filed: Nov. 15, 1999

(51) Int. Cl.$^7$ .............................................. G06F 17/30
(52) U.S. Cl. ...................... 707/5; 707/1; 707/3; 707/6; 707/102; 707/104.1; 707/514
(58) Field of Search .................. 707/1–10, 100–104.1, 707/500, 501.1, 513–515, 532, 536, 907, 200–205, 500.1, 511–514; 709/200–203, 217–219, 223–224, 249; 705/10, 26–27, 21, 51–52; 704/8–10, 202, 231, 251; 706/45–50; 713/201; 700/49–50, 104; 345/835, 838

(56) References Cited

U.S. PATENT DOCUMENTS

| | | | | |
|---|---|---|---|---|
| 5,577,241 A | | 11/1996 | Spencer ........................... | 707/5 |
| 5,898,836 A | * | 4/1999 | Freivald et al. .............. | 709/224 |
| 5,915,249 A | | 6/1999 | Spencer ........................... | 707/5 |
| 5,920,854 A | * | 7/1999 | Kirsch et al. ................... | 707/3 |
| 5,951,642 A | * | 9/1999 | Onoe et al. ................... | 709/224 |
| 5,963,940 A | * | 10/1999 | Liddy et al. ..................... | 707/5 |
| 5,978,828 A | * | 11/1999 | Greer et al. ................. | 709/224 |
| 5,999,971 A | * | 12/1999 | Buckland ..................... | 709/218 |
| 6,052,714 A | * | 4/2000 | Mike et al. ................... | 709/217 |
| 6,065,012 A | * | 5/2000 | Balsara et al. .............. | 707/102 |
| 6,115,458 A | * | 9/2000 | Taskett ......................... | 379/144 |
| 6,199,077 B1 | * | 3/2001 | Inala et al. .................. | 707/501 |
| 6,216,123 B1 | * | 4/2001 | Robertson et al. ............. | 707/3 |

FOREIGN PATENT DOCUMENTS

| | | | |
|---|---|---|---|
| EP | 0 822 502 A1 | 2/1998 | ........... G06F/17/30 |
| GB | 2 329 488 A | 3/1999 | ........... G08F/17/30 |
| WO | WO-97/34221 | * 9/1997 | |
| WO | WO 97/34221 A1 | 9/1997 | |
| WO | WO 98/01809 A1 | 1/1998 | ........... G06F/17/30 |
| WO | WO-98/04979 | * 2/1998 | .................... 17/30 |
| WO | WO-97/19564 | * 5/1999 | |

OTHER PUBLICATIONS

Yoshinaga, K et al., Multi–lingual intelligent information retriaver with automated ontology generator, Knowledge--based intelligen information engineering systems, third international conference, 1999, pae 62–65.*

Martin P Courtois et al., Results ranking in web search engines, Online, May 1999, www.onlineinc.com/onlinemage/OL1999/courtois5.html, p. 1–12.*

"Unraveling the Web" newspaper articles, San Francsico Chronicle Business Section, Aug. 30, 1999, Intenet p. C3 Total 6 pages only.

* cited by examiner

*Primary Examiner*—Srirama Channavajjala
(74) *Attorney, Agent, or Firm*—Mitchell S. Rosenfeld

(57) ABSTRACT

The present invention provides a system for managing information on a computer network having a server by gathering summary data from the information provider node indicative of event changes at the information provider node by information collection agents extracting information from the information provider node based on the summary data; transmitting the extracted information to the server; storing the transmitted information in an event database; cataloging the stored information into hierarchical categories; retrieving with a delivery agent based upon the hierarchical categories selected information from the stored information; and transmitting the selected information to the client node.

15 Claims, 4 Drawing Sheets

COMPUTER NETWORK INFORMATION MANAGEMENT SYSTEM AND METHOD USING INTELLIGENT SOFTWARE AGENTS

FIELD OF THE INVENTION

This invention relates generally to a computer network information management system and method, and more particularly, a system and method for gathering, cataloging, storing, reporting and retrieving information from the Internet and intranets.

BACKGROUND OF THE INVENTION

It is well known to network remote computers. The largest current computer network in the world is the Internet, in which users are able to access information created by Web site providers that are located all over the world.

A disadvantage of the Internet is that it can be difficult to locate the information that is being provided. It is well known to use search engines to find information, wherein the user can enter keywords relating to the information which is being sought. Traditional search engines gather information by submission from the Web site creator and/or by actively retrieving information from Web site on the Internet. The search engines utilize "spiders" or "crawlers" to visit a Web page, read it and record the words on each page. The spider then makes a list of which words appear on which pages and returns those pages whenever a user types in that keyword. Generally, the more times a keyword appears on a page, the higher it ranks on a list of results.

However, search engines often produce skewed results. Many Web site providers "wallpaper" their pages, loading them up with keywords so the page will jump to the top of the search list results. Also, very different results can be obtained merely by changing the order and/or spelling of the keywords. Another disadvantage of search engines is that the information that is available on the Internet is identified and referenced by search engines themselves, which means that new or updated information may not appear straightaway. Old references will remain on a search engine and will not be automatically removed. Thus, the user could be provided with a list of information which is either out of date or unavailable. Another disadvantage of search engines is that new providers of information can find it difficult to get their information registered.

An alternative to pure search engine schemes, are directories which use pre-defined hierarchical categories. Information available on the Internet is catalogued and assigned to the pre-defined categories which may be accessed via either a search engine or by a user clicking through the hierarchy tree.

The popularity of the Internet has given rise to intranets founded on the same technological principles underlying the Internet. The introduction of Internet technology to complex corporate intranets has brought a new dimension to the publishing and delivering of information throughout the business world. This new development has created a situation where it is much easier for employees to produce meaningful, well presented, understandable documents targeted at a company wide audience.

With this ability comes a number of problems. The same problems encountered with the Intranet are found with intranets. Additionally, new problems include additional workload to publish information, IT resource to install client software, employee training, changing existing work practices, information overload, access controls, de-centralization of information, difficulty in locating information, delivering information to the right targets, removing obsolete information, document version control, and validity of information.

The search engines and directories that are prevalent on the Internet have the same short comings when applied to intranets. Additionally, search engines and directories are not equipped to handle the wider range of information that resides in corporate intranets such as email, databases, and specially formatted documents (e.g., MS Word, Power Point, Word Perfect).

What businesses require is a single solution that allows them to make the most of the benefits presented by Intranet technology without the long list of problems. The present invention solves these problems by:
1. Providing a method of allowing employees to continue to produce information as they already do.
2. Publishing that content without any additional workload to those employees.
3. Performing all tasks without special client software.
4. Gathering information together at a central location.
5. Delivering information in a timely and none intrusive fashion to its target audience.
6. Assisting in finding required information.
7. Preventing access to confidential information.
8. Maintaining all data automatically.

SUMMARY OF THE INVENTION

The present invention provides a system for managing information on a computer network having a server by gathering summary data from the information provider node indicative of event changes at the information provider node by information collection agents extracting information from the information provider node based on the summary data; transmitting the extracted information to the server; storing the transmitted information in an event database; cataloging the stored information into hierarchical categories; retrieving with a delivery agent based upon the hierarchical categories selected information from the stored information; and transmitting the selected information to the client node.

The present invention has other objects and advantages which are set forth in the description of the Best Mode of Carrying Out the Invention. The features and advantages described in the specification, however, are not all inclusive, and particularly, many additional features and advantages will be apparent to one of ordinary skill in the art in view of the drawings, specification, and claims herein.

BEST MODE OF CARRYING OUT THE INVENTION

The present invention provides a novel computer network information management system and method for gathering, cataloging, storing, reporting and retrieving information from information sources on the Internet and intranets. By deploying system 20 an organization can ensure that all the knowledge within it is available to all its members. System 20's unique set of software components communicate and work with each other to produce a feature rich solution without making demands on either IT staff or any other departments.

Figure 1:
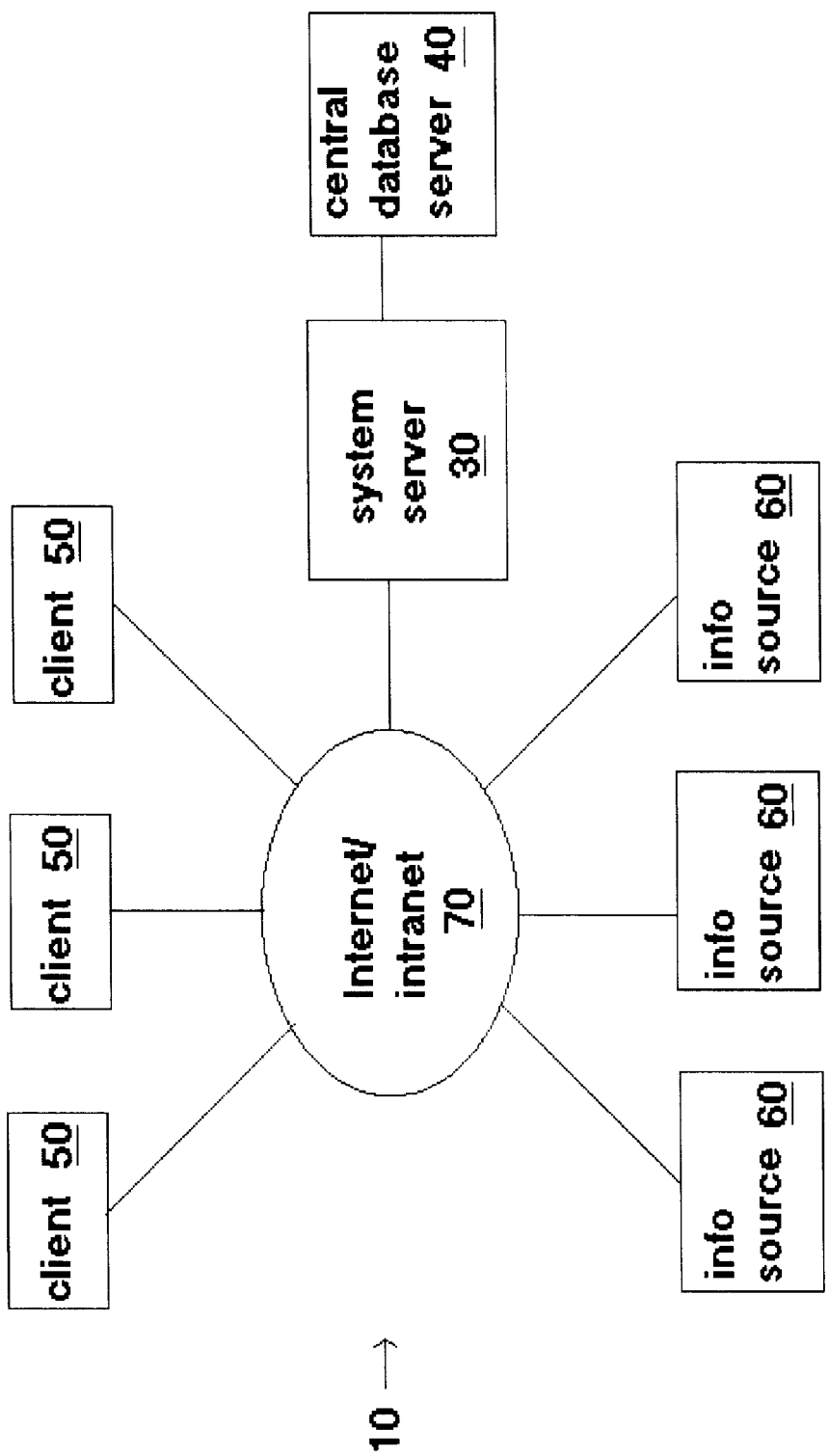
FIG. 1 is a block diagram of a computer network incorporating the system of the present invention.
Figure 2:
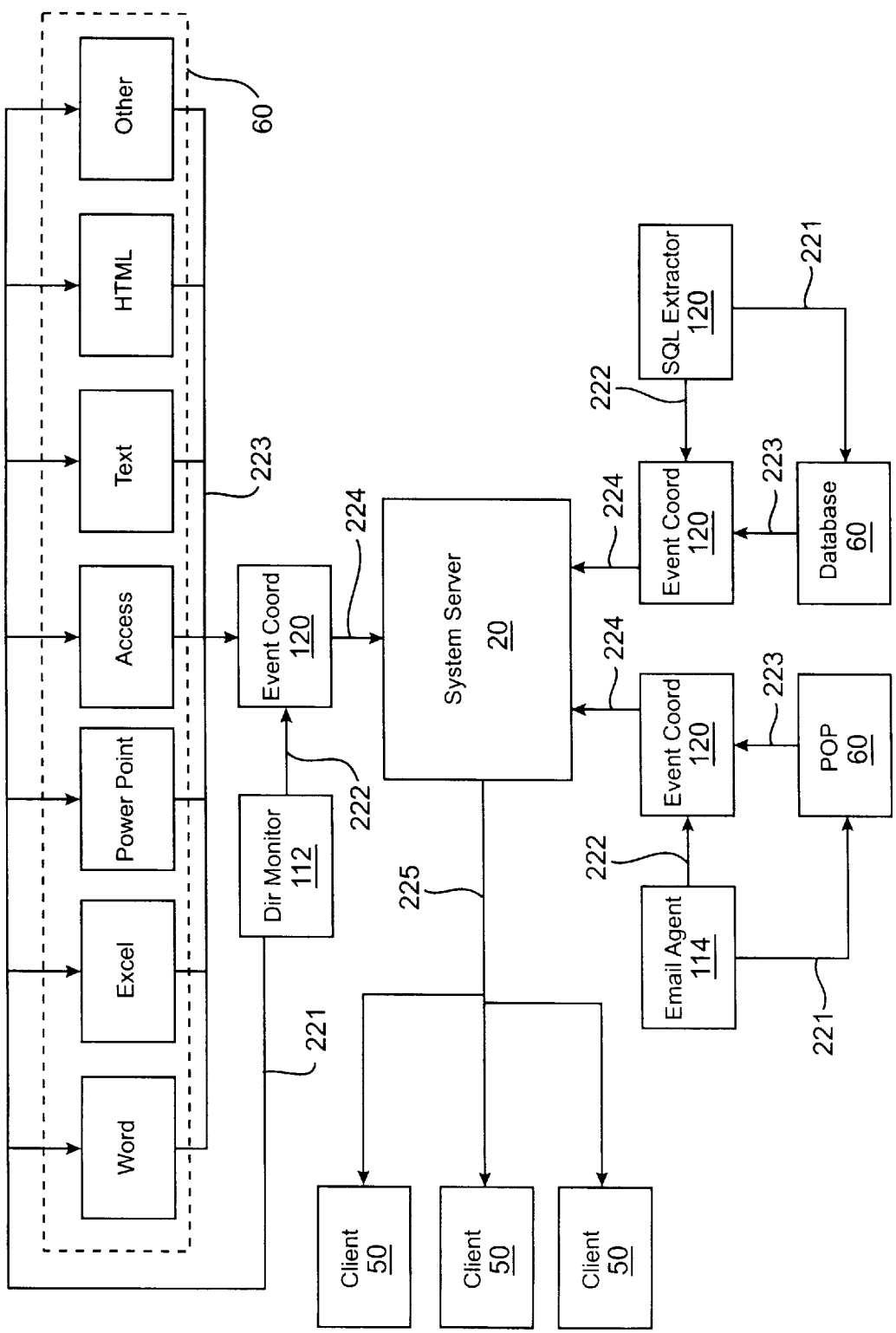
FIG. 2 is a block diagram describing the action/reaction chain of events in the present invention.

FIG. 1 depicts the general structure a computer network 10 where the present invention is employed. System 20 of the present invention includes a system server 30 which is a general purpose computer configured as an Internet server with a wide array of software modules 100. System server 30 includes a commercially available operating system (preferably Microsoft Windows NT), commercially available Internet server software (preferably MS Internet Information server) and commercially available database software (preferably Microsoft SQL server).

System server 30 works preferably with the Microsoft® Windows® NT operating system. However, using customized agents or extracting information from web links, information can be extracted from any type of remote system regardless of operating system. Because the interface to system 20 may be viewed using a standard web browser, system 20 may be accessed by any system capable of running a web enabled browser. System server 30 uses NT security for determining who can and who may not access system 20. This information is extracted from the NT security system by the colony User Manager program.

The core system is implemented as a number of standard Dynamic Link Libraries (DLLs) utilizing Microsoft's ISAPI standard with Internet Information Server. The DLLs use information passed to them through IIS to interrogate central server database 40 and build web pages that are passed back through IIS. This information is then available through a client-side web browser.

System server 30 uses Microsoft® SQL Server to provide the necessary database functionality. The ISAPI applications connect to SQL using ODBC. The standard SQL Server security model provides security. System server 30 utilizes Microsoft's® Internet Information Server and SQL Server to manage all the information submitted from the organization.

System 20 has been designed to work with and get the most from the above commercially available products. By using industry standard, scalable technology system enables organizations to get the most from their information and brings enterprise wide knowledge sharing within reach of all businesses while causing minimal impact on existing information systems, thereby protecting current investments.

Instead of redirecting the current information systems strategy and forcing new working practices to be implemented, system 20 works with existing systems and provides a methodology for getting existing information into a central repository and delivering that content to those employees who need it.

As depicted in FIG. 1, computer network 10 comprises a plurality of nodes which are client computers 50 (e.g., employees desktop computers in a corporate intranet or a home user's computer that is connected to the Internet) and information provider computers 60 (e.g., the customer service database in a corporate intranet or a Web site server on the Internet) connected to an interconnection network 70 (such as an ethernet or the Internet).

In accordance with the present invention a broker computer or system server 30 is connected to compute network 10 and if connected to the Internet has its own URL. System server 30 has catalog database 45 in central server database 40 which is split into a plurality of subject matter and sub-headings. For example, there may be a heading for recreational activities, under this there may be a heading for sports having a sub-heading for motor sports. Thus, the headings are arranged in a hierarchical fashion.

The objectives of the present invention are carried out by software components 100 identified and are described in detail below. Some of software components are agents, which are autonomous portions of code (i.e., software modules) that do not require human interaction and can communicate and change state on its own based upon its goal.

1. Information Collection Agents 110
   a) Directory Monitors 112: These agents monitor events throughout the enterprise and react when anything relevant occurs. They are the basic sensors of system 20 continuously watching over the activity within the organization.
   b) E-Mail Readers 114: These agents read e-mail messages from specified mailboxes and post the messages to system 20 server.
   c) SQL Extractors 116: These agents run SQL queries on existing databases. A results page is produced and sent to system 20 server. When the result set from a query changes, SQL extractor 116 will send the new results to system server.
2. Event Coordinator Agents 120: These are fed event data by information collection agents 110. They react to the event data given to them and take the appropriate action to extract and transmit the desired information identified by the event data back to system 30.
3. Link Agents 130: These follow web links and extract information and pass it back to system 20 server.
4. Catalog agent 140: This agent uses fuzzy logic to determine the proper categories information obtained from information collection agents 110.
5. Web Builder 150: A simple client program which allows employees with no knowledge of HTML to build simple pages and upload information to the Intranet.
6. Configuration utility 160: This utility allows configuration of the main system attributes.
7. Implementation Manager 170: This module assists with the initial setting up of categories for use within system 20.
8. Category Management 180: System 20 management suite allows system 20 to be set up so that it models both the organizational structure and the physical locations. This aids in the location and distribution information.
9. User Manager 190: The User Manager controls access to all data within system 12. This is completely integrated with Microsoft® Windows NT operating system.
10. Delivery Agents 200: System 20 uses agent technology to deliver all information to those employees to whom it is relevant.
11. Global Searching module 210: System 20 allows global searching on all content in central server database 40.
12. Category Searching module 220: System 20 allows searching by category.

Gathering Content

The first stage for system 20 is to gather the information content from existing information sources. The information gathering process is depicted in FIG. 1.

System 20 carries out the following steps:
   221: Information collection agents 110 detect information (directory monitor 112 detects directory/file change events, email reader 124 detects new email and SQL extractor 116 queries databases for changes in the data)

222: Information collection agents 110 communicate the change events to event coordinators 120

223: Event coordinators 120 extract the information

224: Event coordinators 120 transmit the extracted information to system server 30

225: System server 30 distributes to all employee/users at clients 50 that request the information.

The details of those agents are discussed below.

Directory Monitors 112

Directory monitors 112 are autonomous agents that directly monitor changes such as additions, modifications, and deletions from a directory structure on a network. Unlike crawlers and spiders, this ensures that the content held by system database 14 is always current. Each directory monitor 112 knows about the current state of the directory (or directories) being monitored. Each time a change occurs an event is logged by directory monitor 112 that communicates this change to its event database.

Directory monitor 112 can monitor any directory that is visible to it, these may be shared directories on any node on computer network 10 or any directory on the computer on which the agent is running. Also, directory monitor 112 can monitor documents of some or all file types, including HTML, Microsoft® Access, Microsoft® Powerpoint, Microsoft® Word, Microsoft® Excel or plain text documents. System 20 can process 270 different file types through the use of Outside In technology from Inso. All commonly used file types can be handled without the need to have the application which created the file available.

Content monitored by directory monitors 112 is mapped directly to an appropriate category within central server database 40. Therefore, information can be automatically classified by directory monitor 112 based on the location from which it originated.

If no category is specified system 20 will automatically place the information in the category containing similar documents utilizing catalog agent 140, which is discussed in detail below. When new events are detected and written to the event log, control of the process switches to event coordinator agent 120.

The details of these agents are discussed below.

E-Mail Readers 114

These agents monitor selected POP3 email accounts and publish the messages received in either a category designated by the author of the email or automatically categorizes the received email utilizing catalog agent 140. Email reader agents 114 can be used to implement automated customer support or any other system where rapid, intelligent responses are required to inbound messages. When new events are detected and written to the event log, control of the process switches to event coordinator agent 120.

Email reader 114 poles the POP account it has been pointed at on a particular server. If there are no messages it stops. If there are messages it reads the messages and posts them back to system server 30 either to a specific category (specified at the time the agent was set up) or uses the usual method to determine the "best fit" category for the incoming information SQL Extractors 116

These agents extract data from SQL databases using queries on a regular timed basis. These can be used to monitor trends or to notify users about particular trigger events that may occur. The end user does not require any knowledge of SQL queries and does not require access to the database from where the data is extracted. Only SQL extractor agent 116 needs access. Results from SQL extractors 116 are published as HTML documents in the categories specified by the administrator. When new events are detected and written to the event log, control of the process switches to event coordinator agent 120.

Event Coordinators 120

Event coordinator agent 120 is a background process that monitors the generation of events by information collection agents 110. Event coordinator agents 120 are responsible for deciding what method to use for the extraction of data from the source information and transmitting that data back to central server database 40.

Depending on the type of information, event coordinator agent 120 may deal with the extraction using internal filters, or may use Microsoft's Component Object Model (COM) automation to load the required application and extract data using the accessible objects within that application.

Once the extraction has been successfully completed, event coordinator agent 120 communicates with system server 30 and transmits the extracted information to system server 30 for processing. As well as sending the raw data extract, event coordinator agent 120 also provides information for system server 30 enabling it to place the data sent into the appropriate category. In order to do this, event coordinator agent 120 has an HTTP link to system server 30.

Information collection agents 110 and event coordinators 120 work together at the production end of system 20 to extract and update information for central server database 40 without any intrusion on the actions of the producers of that information. They require no action by the producer of the information. Once set up by a system administrator they act without the user of MS Word, for example, being aware of their actions. The employees who produce this information are not required to perform any additional actions, do require any additional software, require no training and need not even be aware that this process is occurring.

This represents a very powerfill low impact and low cost method of getting information into a central resource so that it is easily accessible to those within an organization whom will most benefit from its content.

Link Agents 130

Figure 3:
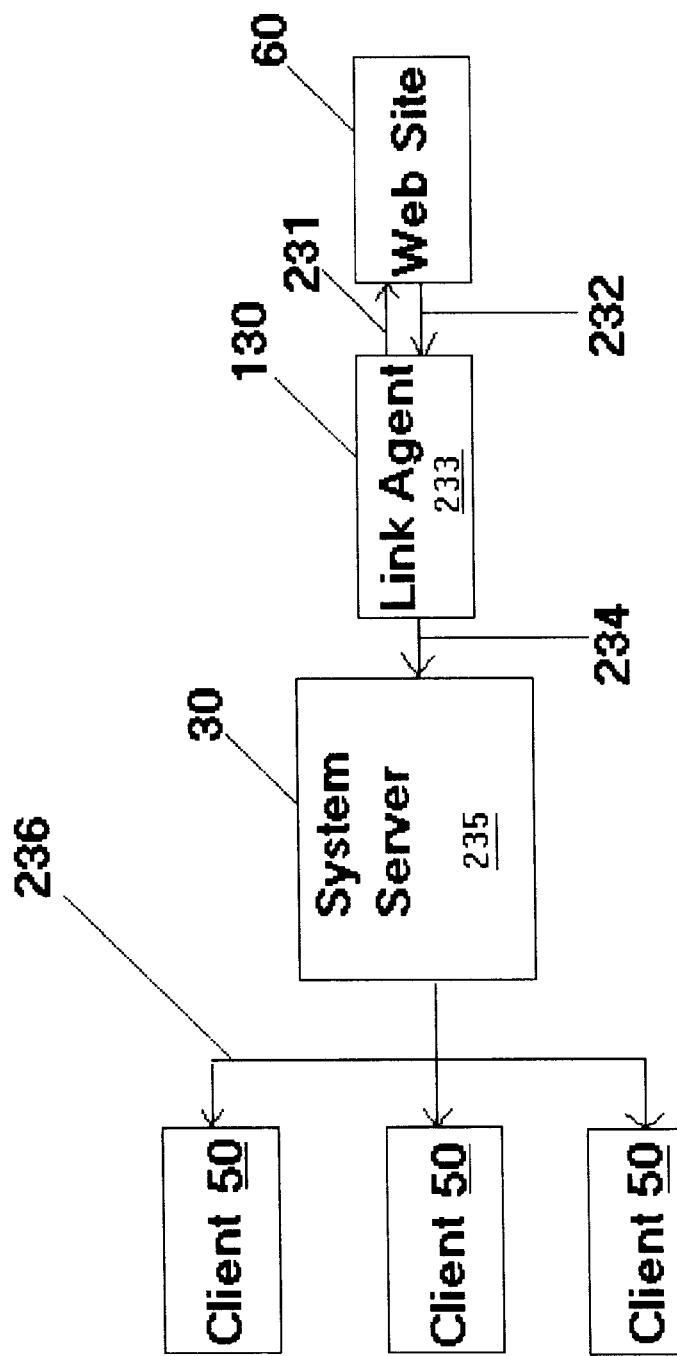
FIG. 3 is a block diagram describing the link chain of events in the present invention.

As well as providing information collection agents 110 and event coordinator agents 120 for near real time data collection and distribution, system 20 also provides a method for following web site links and placing the content of individual web pages into categories within central server database 40, as depicted in FIG. 3.

Link agents 130 follow web links as specified by system 20 administrator and update links as often as requested to do so. The activities of link agents 130 can be restricted to particular web sites by specifying that only links with a known base URL be followed. This prevents link agents 130 from following links to external sites.

Each time link agent 130 loads a new page it extracts the text from the page and sends it back to system server 30 using HTTP. System server 30 then matches the information transmitted against the properties stored for each category and places the content into the category that gives the best match using catalog agent 140.

System 20 utilizes link agents 130 to carry out the following steps as depicted in FIG. 3:

231: Link agent 150 is timer drive to check the content of web site 60

232: If link agent 150 detects changes, it collects the information

233: The link agent 130 analyses the information by:
Creating a list of words within the text Remove all common words as defined in step 1 for catalog agent 140

Proceed as defined in step 2 for catalog agent 140 to find the most common word Proceed as defined in step 2 for catalog agent 140 to extract the relevant sentences

234: The information is transmitted to system server 30 by link agent 130

235: System server 30 catalogs the information to put it in the right category

236: System server 30 distributes the information to all employees/users at clients 50

Link agents 130 have the inherent restrictions of all crawler based technology in that they cannot update information in real time, and the more often they are run the more bandwidth they consume. Their main use is where the underlying directory structure is either unavailable or meaningless. Bandwidth consumption is kept to a minimum by restricting the subsequent access to pages so that only those that have changed are reprocessed.

Catalog Agent 140

This process uses a number of pattern matching and fuzzy logic algorithms to assign the information from event coordinators 120 and link agents 130 to the correct categories. Additionally, new categories are created dynamically when need. The logic is described below.

1. Learning Phase (generating a common world list)
   a. Read a sample set of documents and break them down into words
   b. Find out which words occur in most documents (The value for the percentage of documents in which a word must appear is pre-defined by an optimization process. Different values are tested until the best one is identified. The usual figure is around 85% of documents.)
   c. Store these words within a common word list (CWL)
2. Read a document to calculate the "relevance factor" (RF) for each category, assign the document to the relevant categories and generate new categories as needed by the following steps.
   a. Remove from the document all common words defined by the CWL generated in step 1 above to leave a relevant word list (RWL)
   b. Do you have any words in the current training word list (TWL)? This query is carried in the context of automatically categorizing a list of documents with no prior knowledge of those documents and no initial categories. In normal operation in relation to directory/file, e-mails, database and other incoming information the TWL varies. Typically, the TWL is formed by the words in the category which first comes into existence when, by whatever means, a category is created.
   c. If not, add the RWL to the training word list and set the "new category" event. In the case where there are no categories, there are no training words to compare anything with, so it just uses those from the first document it reads. The new category event just indicates that this category didn't exist before so it has to make up a name for it before it moves on.
   d. Compare the RWL to the TWL and calculate the "relevance factor" (RF)
      Algorithm is defined as:
         X=Number of words present in the RWL that are not in the TWL Y=Number of words in the RWL $RF = (100 * X) / Y$ e. If the value of RF is less than the relevance threshold (RT) (This value is set by an optimization process. Different values are tested until the best one is identified. The usual figure is around 25%.) then:
      i. Add this document to the current category
      ii. Create ranked by order of occurrence the most frequent word list (MFWL) from the words in the RWL
      iii. Find sentences in the document containing the top 3 words in the MFWL
      iv. Store these sentences as a summary
      v. Store the top 10 words as the document keywords from the words in the RWL
      vi. Add words in the RWL that are not in the TWL to the TWL
      vii. If the "new category" event is true, give this category a name by:
         1. Find a sentence containing the top word from the MFWL
         2. Extract the noun phrase from the sentence and use this as the name
         3. Send a coded instruction to system server 30 requesting "set up a new category called <Whatever>"
   f. If the value of RF is greater than the relevance threshold (RT) then:
      i. Repeat for the next TWL from the next category
      ii. If there are no more categories, set the new category flag and repeat The method applied by catalog agent 140 can be used to automatically categorize documents, e-mail and database information but is also used to enable automated responses to inbound messages or emails. The same technique is also applied to matching any text based descriptive information. Essentially, the method here defined is generic to the type of information being categorized. One of ordinary skill in the art would be able to easily adapt the method described above for each particular type of information.

The categorization process can be restricted by system 20 administrator. In essence this means that, where it is known that information from a particular site will all belong in some high level category, only sub categories of that high level category will be used to determine the end placing of the information from this site.

Web Builder 150

Sometimes employees may wish to publish information as a web site in a format that requires their own input and customization. System 20 includes web publishing tool. With no knowledge of HTML or web page building, web builder 150 allows employees to build web sites and publish them on the Intranet with ease. An example of a commercially available web page builder in Microsoft Frontpage. Such as commercially available software can be integrated into System 20.

Web builder 150 integrates completely with system 20. Once a web site has been built the publisher decides which category she wishes to place the information in. With the press of a button, the information is uploaded to the holding server, transferred to the web server, placed in the correct system category, and all employees who are subscribed to that category will be notified of the existence of new content. In the event no category is specified, catalog agent 140 makes the determination.

MANAGING CONTENT

Figure 4:
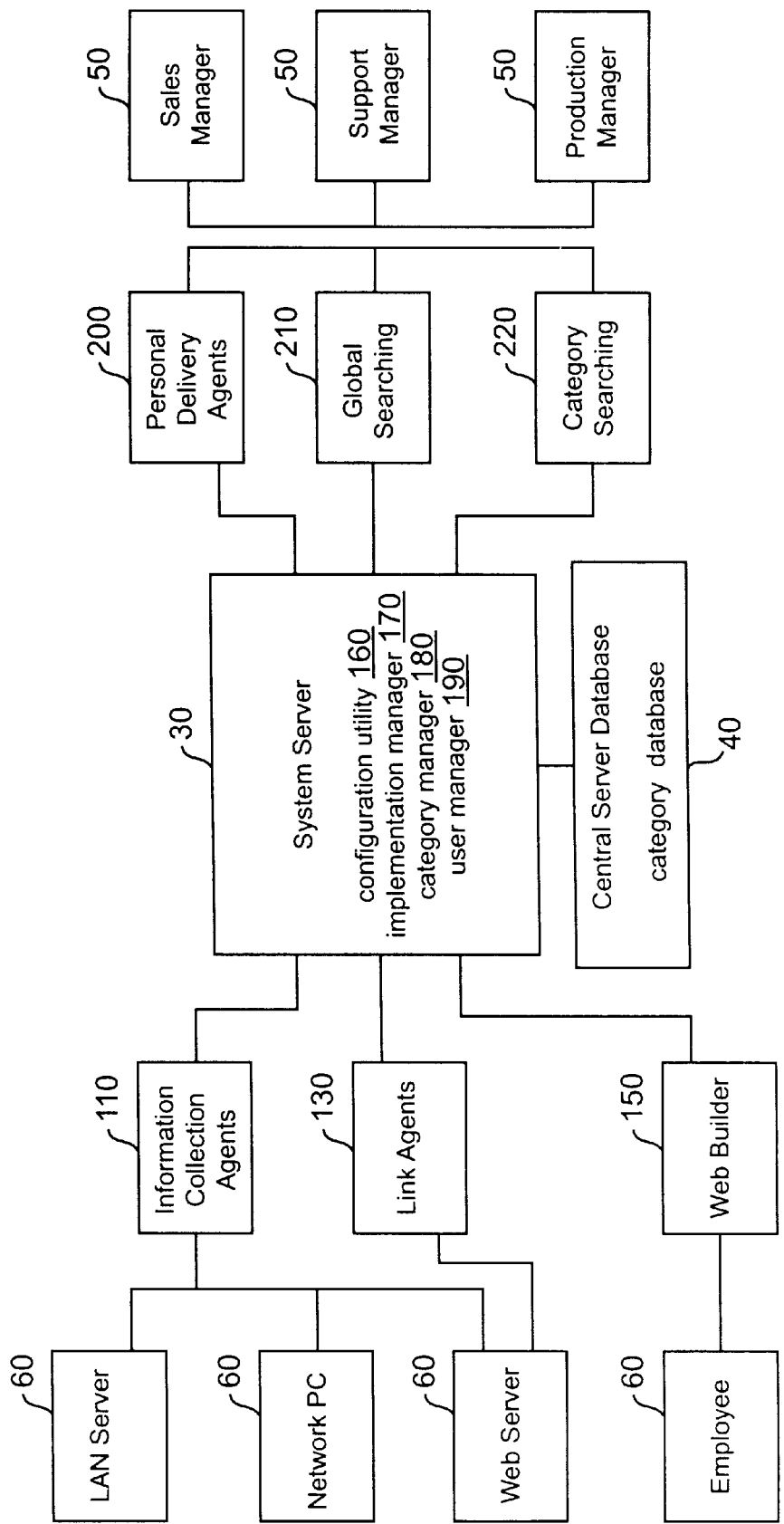
FIG. 4 is a block diagram describing the topology of the present invention.

Once the content required has been collected and received by system 20 server, the management of that content is taken over by the database management system as depicted in FIG. 4. This contains a rich set of features for the management of that data.

Configuration Utility 160

System 20 can be configured easily to work in any environment supporting HTTP. All the main attributes of system 20 can be altered easily using the system server configuration utility 160. These include the location of the server side applications, the location of all the images and documents used by system 20 and the location of system 20 Homepage.

Other configurable options are the address of the SMTP mail server and all additional POP3 information such as the email address for system support. The configuration utility also deals with the access information required by the SQL Server database.

Implementation Manager 170

The structure of any implementation of system 20 should mirror the structure of the organization where it is used. System 20 provides implementation manager 170 to assist with the initial setting up of categories for use within system 20. As well as providing these features, the program also has various validation procedures for checking dependencies and categories within system 20.

Category Manager 180

Any business will change over time. System 20 includes category manager 180 that allows structural changes to the system model. It also provides procedures for maintaining information details, chat information, messages, agents and all information associated with a particular category. This program provides the administrator with a tool for moving information from one category to another updating all dependencies automatically as this occurs.

Another feature of category manager 180 is the association of particular phrases and keywords with a category. This information is used internally by system 20 to determine the location of information submitted to system 20. These phrases and keywords can be assigned relevance according to boolean attributes given to them. By using this information to compute a 'relevance factor', system 20 is able to best guess the category in which a particular piece of information belongs using fuzzy logic. Also, the administrator utilizes category manager 180 to set the parameters associated with catalog agent 140.

When a category is added to system 20, system 20 automatically generates keywords and phrases from the full category name. So, if a category is created called Lawyers/Patent Attorney/California it would assign the phrase "Patent Attorney" to the "should contain phrase" list and it would assign the keywords "Lawyers", "Patent", "Attorney", "California" to the "should contain keywords" list.

When the system 20 receives information from whatever source, it uses the algorithm for catalog agent 140 as defined for context extraction to establish its true home category. The keywords and phrases above provide the values for the Training Word List (TWL). By comparing the incoming information to the auto-created TWL the relevance factor is calculated. The information will go into the category with the best relevance factor.

User Manager 190

System 20 contains a rich set of security and access control functions linked closely to those of Windows NT. User manager 190 provides a set of features which allows system 20 administrator to assign users and groups access to specific categories only. System 20 links the categories to NT users and groups and only those users with correct permissions will be able to see information in system 20. Users who have been deleted from NT will automatically be removed from system 20 each time user manager 190 is run.

Delivering Content

Access to information is restricted by User Manager 220 so only information which should be available to particular employees is available. These access controls are handled dynamically so when an employee's access rights are altered, the information that is delivered to them is altered at the same time by system 20. The delivery of content is depicted in FIG. 4.

Personal Delivery Agents 200

System 20 contains many features for the delivery of content to specific employees based on their individual requirements by personal delivery agents 200. This feature is simple to use but extremely powerful. It requires no client side software with all functionality being provided through a standard web browser. Those who wish to monitor activity within a particular category or group of categories can do now do so with ease.

Individual personal delivery agents 200 are provided for employees that allow each person to subscribe to individual system categories. This enables every person within an organization to be informed of all changes to information that is relevant to them. Every time an employee accesses their personal system page they are presented with all updates that have occurred in subscribed groups. Because this information is contained in a single web page they are not swamped with update notifications.

They can elect to be notified of changes by email but even here there is strict control over the number of messages sent by system 20. Each user will only receive one notification by email that contains a web link back to their personal page so that they may observe all changes that have occurred. Only one email message will be sent until they next visit their individual web page.

In this manner, system 20 is able to keep employees informed about updates that occur in their specific areas of interest without generating excessive notifications and additional workload.

Personal delivery agents 200 handle all of this. The software is invisible to the individual employee and requires no maintenance on their part. All they have to do is select their interest areas the rest is handled automatically by personal delivery agent 200.

Each individual user can also make use of the Link agent robots for research. This research can assist with projects or competitor intelligence by keeping the individual informed of changes in the project or a competitor's web site as the changes occur. The robot can be instructed to search the web for any subject and return to the user any relevant information it finds. Again, the software rather than the user does the work.

Global Searching 210

As well as utilizing agents for finding information system 20 provides search facilities for finding information within the database. Global searching allows employees to find information located in any category heading or within the information held under any category. Rather than returning results as documents which contain keywords system 20 returns results by placing the category which contains the keyword most often at the top of the result list.

This feature aids employees by providing results in a context oriented fashion. Often keyword searches produce irrelevant results. Keywords can be present in documents that are not in the context required by the user. By presenting the results by context system 20 aids the location of documents which are truly relevant to the individual's requirements.

By selecting the category, which is most relevant to the context of their requirements system 20 then displays individual documents within that category which contain the keywords, requested. System 20 supports a number of search types allowing for different combinations of keywords.

Category Searching 220

As well as global searching system 20 supports keyword searching at the category level with category searching module 220. This allows narrow band searching for specific information within a category. This feature is functionally the same as global searching, except that in this instance the search only looks at information within the selected category. All search functions will only return information for which the particular employee has the required permissions. Information and categories that they should not see will not be presented to them.

From the above description, it will be apparent that the invention disclosed herein provides a novel and advantageous computer network information management system. The foregoing discussion discloses and describes merely exemplary methods and embodiments of the present invention. One skilled in the art will readily recognize from such discussion that various changes, modifications and variations may be made therein without departing from the spirit and scope of the invention. Accordingly, disclosure of the present invention is intended to be illustrative, but not limiting, of the scope of the invention, which is set forth in the following claims.

I claim:

1. A method for managing information on a computer network having a server, at least one client node and at least one information provider node, and a database at the server containing pre-stored information from the at least one information provider node, comprising the steps of:
   gathering change data from the information provider node indicative of event changes at the information provider node relative to the pre-stored information in the database by information collection agents;
   extracting information from the information provider node based on the change data;
   transmitting the extracted information to the server;
   storing the transmitted information in the database;
   cataloging the stored information into hierarchical categories;
   retrieving with a delivery agent based upon the hierarchical categories selected information from the stored information; and
   transmitting the selected information to the client node, wherein the cataloging step is comprising the steps of:
      generating a common word list (CWL) consisting of words that occur most often in a sample set of the pre-stored information;
      generating a relevant word list (RWL) consisting of all words in the stored information not in the CWL;
      calculating a relevance factor (RF) indicative of the relevance of the stored information to a current hierarchical category, based upon the RWL;
      comparing the RF to a relevance threshold (RT); and
      if the RF exceeds the RT, adding the extracted information to current category.

2. The method recited in claim 1, further comprising the steps of:
   generating a training word list (TWL) for the current category based upon the RWL for the pre-stored information already in the current category; and
   calculating the relevance factor (RF) based upon the RWL and the TWL.

3. The method recited in claim 2, wherein the RF is calculated according to the following algorithm:

$$RF=(100*X)/Y,$$

where

X=number of words present in the RWL that are not in the TWL, and

Y=number of words in the RWL.

4. The method recited in claim 1, further comprising the steps of:
   if the stored information is added to the current category, adding the words from the RWL to the TWL for the current category.

5. The method recited in claim 1, wherein if the stored information is added to the current category, further comprising the steps of:
   creating a most frequent word list (MFWL) consisting of the words in the RWL ranked by order of occurrence;
   identifying sentences in the stored information containing one or more of the highest ranked words in the MFWL; and
   creating a summary of the stored information based upon the identified sentences.

6. A system for managing information in a computer network comprising:
   an interconnection network;
   a plurality of client nodes coupled to the interconnection network;
   a plurality of information provider nodes coupled to the interconnection network;
   a system server coupled to the interconnection network;
   a database coupled to the system server containing pre-stored information from the information provider nodes;
   means for autonomously gathering change data from the information provider node indicative of event changes at the information provider node relative to the pre-stored information the database;
   extracting information from the information provider node based on the change data;
   means for autonomously extracting information from the information provider nodes based upon the change data;
   means for autonomously coordinating the extracting of information by the extracting means and for autonomously transmitting the extracted information to the system server via the interconnection network;
   means located at the system server for cataloging the extracted information transmitted from the coordinating means, wherein means for cataloging is comprising:
      means for generating a common word list (CWL) consisting of words that occur most often in a sample set of the pre-stored information;
      means for generating a relevant word list (RWL) consisting of all words in the extracted information not in the CWL;

means for calculating a relevance factor (RF) indicative of the relevance of the extracted information to a current hierarchical category, based upon the RWL;

means for comparing the RF to a relevance threshold (RT); and if the RF exceeds the RT, adding the extracted information to the current category.

7. The system recited in claim 6, further comprising:

means for generating a training word list (TWL) for the current category based upon the RWL for the pre-stored information already in the current category; and means for calculating the relevance factor (RF) based upon the RWL and the TWL.

8. The system recited in claim 7, wherein the RF is calculated according to the following algorithm:

$$RF=(100*X)/Y,$$

where

X=Number of words present in the RWL that are not in the TWL, and

Y=Number of words in the RWL.

9. The system recited in claim 6, further comprising:

means for adding the words from the RWL to the TWL for the current category, if the extracted information is added to the current category.

10. The system recited in claim 6, wherein if the extracted information is added to the current category, further comprising the steps of:

means for creating a most frequent word list (MFWL) consisting of the words in the RWL ranked by order of occurrence;

means for identifying sentences in the extracted information containing one or more of the highest ranked words in the MFWL; and means for creating a summary of the extracted information based upon the identified sentences.

11. A system for managing information in a computer network gathered from a plurality of information provider nodes for transmission to a plurality of client nodes via an interconnection network comprising:

a system server coupled to the interconnection network;

a database coupled to the system server containing pre-stored information from the information provider nodes;

means for autonomously gathering change data from the information provider node indicative of event changes at the information provider node relative to the pre-stored information in the database;

extracting information from the information provider node based on the change data;

means for autonomously extracting information from the information provider nodes based upon the change data;

means for autonomously coordinating the extracting of information by the extracting means and for autonomously transmitting the extracted information to the system server via the interconnection network;

means located at the system server for cataloging the extracted information transmitted from the coordinating means, wherein means for cataloging is comprising:

means for generating a common word list (CWL) consisting of words that occur most often in a sample set of the pre-stored information, means for generating a relevant word list (RWL) consisting of all words in the extracted information not in the CWL;

means for calculating a relevance factor (RF) indicative of the relevance of the extracted information to a current hierarchical category, based upon the RWL;

means for comparing the RF: to a relevance threshold (RT); and if the RF exceeds the RT, adding the extracted information to the current category.

12. The system recited in claim 11, further comprising:

means for generating a training word list (TWL) for the current category based upon the RWL for the pre-stored information already in the current category; and means for calculating the relevance factor (RF) based upon the RWL and the TWL.

13. The system recited in claim 12, wherein the RF is calculated according to the following algorithm:

$$RF=(100*X)/Y,$$

where

X=number of words present in the RWL that are not in the TWL, and

Y=number of words in the RWL.

14. The system recited in claim 11, further comprising:

means for adding the words from the RWL to the TWL for the current category, if the extracted information is added to the current category.

15. The system recited in claim 11, wherein if the extracted information is added to the current category, further comprising the steps of:

means for creating a most frequent word list (MFWL) consisting of the words in the RWL ranked by order of occurrence;

means for identifying sentences in the extracted information containing one or more of the highest ranked words in the MFWL; and means for creating a summary of the extracted information based upon the identified sentences.

* * * * *